United States Patent
Jiang et al.

(10) Patent No.: US 12,052,382 B2
(45) Date of Patent: Jul. 30, 2024

(54) METHOD FOR URGENTLY SENDING MESSAGE, APPARATUS, AND STORAGE MEDIUM

(71) Applicant: Beijing Zitiao Network Technology Co., Ltd., Beijing (CN)

(72) Inventors: Yan Jiang, Beijing (CN); Ziang Zhang, Beijing (CN)

(73) Assignee: Beijing Zitiao Network Technology Co., Ltd. (CN)

( * ) Notice: Subject to any disclaimer, the term of this patent is extended or adjusted under 35 U.S.C. 154(b) by 0 days.

(21) Appl. No.: 18/537,339

(22) Filed: Dec. 12, 2023

(65) Prior Publication Data
US 2024/0171668 A1 May 23, 2024

Related U.S. Application Data

(63) Continuation of application No. PCT/CN2022/138640, filed on Dec. 13, 2022.

(51) Int. Cl.
 *H04M 1/72403* (2021.01)
 *H04M 1/72469* (2021.01)
(52) U.S. Cl.
 CPC ... *H04M 1/72403* (2021.01); *H04M 1/72469* (2021.01)
(58) Field of Classification Search
 CPC .............. H04M 1/72403; H04M 1/72469
 See application file for complete search history.

(56) References Cited

U.S. PATENT DOCUMENTS

| | | | |
|---|---|---|---|
| 10,299,102 B1 * | 5/2019 | Suxena | H04B 17/373 |
| 2003/0185353 A1 | 10/2003 | Fulton et al. | |
| 2020/0066415 A1 | 2/2020 | Hettig et al. | |
| 2021/0385705 A1 | 12/2021 | Liu et al. | |
| 2023/0113369 A1 * | 4/2023 | Wang | H04L 65/4053 |
| | | | 709/204 |

FOREIGN PATENT DOCUMENTS

| | | | | |
|---|---|---|---|---|
| CN | 105007363 A | 10/2015 | | |
| CN | 106487989 A | 3/2017 | | |
| CN | 108718365 A * | 10/2018 | ........ | H04M 1/72522 |

(Continued)

OTHER PUBLICATIONS

International Search Report issued Mar. 3, 2023 for PCT Application No. PCT/CN2022/138640, English translation (11 pages).

(Continued)

*Primary Examiner* — Farid Seyedvosoghi

(57) ABSTRACT

The present disclosure relates to a method for urgently sending a message, an apparatus, a system, and a storage medium. The method comprises: in response to an operation for urgently sending a target message, displaying an urgent send interface, the urgent send interface comprising a plurality of urgent sending modes; in response to an operation of selecting a target urgent sending mode, determining whether an urgent send object selected on the urgent send interface satisfies an interception condition corresponding to the target urgent sending mode; and when an interception condition is satisfied, displaying the intercepted urgent send object and a reason for interception on the urgent send interface.

17 Claims, 13 Drawing Sheets

In response to an operation of expediting a target message, display an expediting interface which includes a plurality of expediting modes — S110

In response to an operation of selecting a target expediting mode, determine whether an expediting object selected in the expediting interface meets interception conditions corresponding to the target expediting mode — S120

When the interception conditions are met, display the intercepted expediting object and interception reasons in the expediting interface — S130

(56) References Cited

FOREIGN PATENT DOCUMENTS

| | | | | |
|---|---|---|---|---|
| CN | 108718365 A | 10/2018 | | |
| CN | 109117609 A | * 1/2019 | ............ | G06F 21/31 |
| CN | 109117609 A | 1/2019 | | |
| CN | 109743246 A | 5/2019 | | |
| CN | 110493121 A | 11/2019 | | |
| CN | 111093232 A | 5/2020 | | |
| CN | 111245706 A | 6/2020 | | |
| CN | 112087365 A | 12/2020 | | |
| CN | 114301862 A | 4/2022 | | |

OTHER PUBLICATIONS

Design and Implementation of the Message Service Management System for the Heilongjiang Provincial Rural Credit Cooperatives Association, 2015, English Abstract Only (63 pages).

Park, T., et al. Message-Aware Uplink Transmit Power Level Partitioning for Non-Orthogonal Multiple Access, Wireless@VT, Bradley Department of Electrical and Computer Engineering, Virginia Tech, 2018 (6 pages).

* cited by examiner

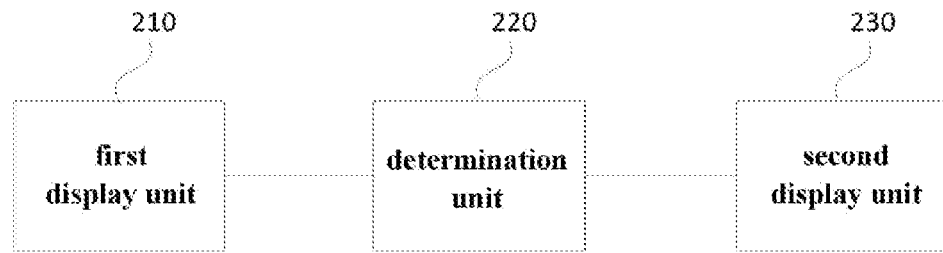
Fig. 20
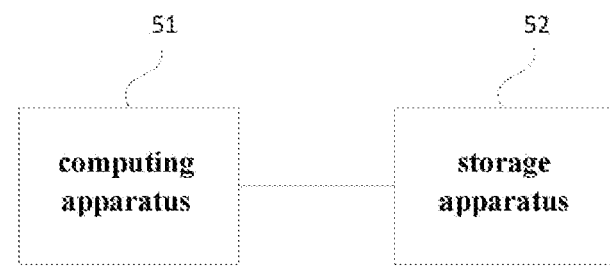
Fig. 21
Fig. 22

METHOD FOR URGENTLY SENDING MESSAGE, APPARATUS, AND STORAGE MEDIUM

CROSS-REFERENCE TO RELATED APPLICATIONS

The present application is based on and claims the priority to the PCT application No. PCT/CN2022/138640 filed on Dec. 13, 2022 and the Chinese patent application No. 202111671077.8 filed on Dec. 31, 2021. The disclosure of each of these applications is incorporated herein by reference in its entirety.

TECHNICAL FIELD

The present disclosure relates to the technical field of instant messaging, and in particular to a message expediting method and apparatus, a system and a storage medium.

BACKGROUND

Currently, much instant messaging software has a message expediting function. Exemplarily, in collaborative work scenarios within an enterprise or in some rescue and disaster relief scenarios, there may be more urgent messages during actual communication that are required to be delivered to the other quickly. The message expediting function allows users to send urgent messages in an expediting manner, so as to improve the collaboration efficiency with others.

However, at present, when expediting a message fails, the sender of the expediting message cannot be informed of such situation in time, which is not conducive to improving the collaboration efficiency with others.

SUMMARY

In order to solve the above technical problem, the present disclosure provides a message expediting method and apparatus, a system and a storage medium.

In a first aspect, the present disclosure provides a message expediting method, including:
in response to an operation of expediting a target message, displaying an expediting interface which includes a plurality of expediting modes;
in response to an operation of selecting a target expediting mode, determining whether an expediting object selected in the expediting interface meets interception conditions corresponding to the target expediting mode; and
when the interception conditions are met, displaying the intercepted expediting object and interception reasons in the expediting interface.

In some embodiments of the present disclosure, the plurality of expediting modes include one or more of the following:
in-app only, app+SMS, and app+phone call.

In some embodiments of the present disclosure, if the target expediting mode is app+SMS or app+phone call, the interception conditions corresponding to the target expediting mode include at least one of the following:
the expediting object crossing domains, the expediting object being an external non-friend, and the information of the expediting object being incomplete.

In some embodiments of the present disclosure, determining whether an expediting object selected in the expediting interface meets interception conditions corresponding to the target expediting mode include:
acquiring client information of the selected expediting object, where the client information includes one or more of the following: client deployment information, client location information, and client registration information; and
determining, based on the client information, whether the interception conditions corresponding to the target expediting mode are met.

In some embodiments of the present disclosure, determining, based on the client information, whether the interception conditions corresponding to the target expediting mode are met includes:
determining, based on the client deployment information, whether deployment domains are crossed; and if so, determining that the interception conditions corresponding to the SMS or phone call expediting mode are met;
determining, based on the client location information, whether domains are crossed; and if so, determining that the interception conditions corresponding to the SMS or phone call expediting mode are met;
determining, based on the client registration information, whether the selected expediting object is an external non-friend; and if so, determining that the interception conditions corresponding to the SMS or phone call expediting mode are met; and
determining, based on the client registration information, whether the registration information is missing a phone number; and if so, determining that the interception conditions corresponding to the SMS or phone call expediting mode are met.

In some embodiments of the present disclosure, displaying the intercepted expediting object and interception reasons in the expediting interface includes one or more of the following:
displaying an early warning prompt in a display area of the plurality of expediting modes; and in response to an operation of a mouse pointer hovering over the early warning prompt, displaying at least one interception reason;
within the selected area in the expediting interface, displaying at least one interception reason at the top and displaying the intercepted expediting objects first; and
displaying the intercepted expediting object in the expediting interface, displaying the early warning prompt on an icon of the intercepted expediting object, and in response to the operation of the mouse pointer hovering over the early warning prompt, displaying the interception reasons of the intercepted expediting object.

In some embodiments of the present disclosure, if the interception reasons of different intercepted expediting objects are different, the display priority of the interception reasons is: the expediting objects crossing domains, the expediting objects being external non-friends, and the information of the expediting objects being incomplete;
and/or
if there are a plurality of interception reasons for the same intercepted expediting object, only the interception reason with the highest priority is displayed for the intercepted expediting object.

In some embodiments of the present disclosure, the expediting interface further includes an expediting sending control, and the method further includes:

in response to an operation of triggering the expediting sending control, sending the target message to the selected expediting object; and if the sending fails, performing one or more of the following: prompting an expediting failure message by means of an online pop-up window;

prompting an expediting failure by means of voice; and pushing an expediting failure message card in an offline terminal.

In some embodiments of the present disclosure, while prompting an expediting failure message by means of an online pop-up window, a view details control is displayed in the pop-up window; and in response to an operation of triggering the view details control, expediting failure information is jumped to;

the expediting failure message card pushed in the offline terminal includes a title and content, and the message card also includes the view details control; and in response to the operation of triggering the view details control, the expediting failure information is jumped to.

In a second aspect, the present disclosure also provides a message expediting apparatus, including:

a first display unit, which is used for displaying, in response to an operation of expediting a target message, an expediting interface which includes a plurality of expediting modes;

a determination unit, which is used for determining, in response to an operation of selecting a target expediting mode, whether an expediting object selected in the expediting interface meets interception conditions corresponding to the target expediting mode; and a second display unit, which is used for displaying, when the interception conditions are met, the intercepted expediting object and interception reasons in the expediting interface.

In a third aspect, the present disclosure also provides a system including at least one computing apparatus and at least one storage apparatus that stores instructions, where the instructions, when executed by the at least one computing apparatus, cause the at least one computing apparatus to perform steps of the message expediting method as described above.

In a fourth aspect, the present disclosure also provides a computer-readable storage medium storing programs or instructions which, when executed by at least one computing apparatus, cause the at least one computing apparatus to perform steps of the message expediting method as described above.

In a fifth aspect, the present disclosure also provides a computer program product including programs or instructions which, when executed by at least one computing apparatus, cause the at least one computing apparatus to perform steps of the message expediting method as described above.

In a sixth aspect, the present disclosure also provides a computer program including program code which, when executed by a computer, causes the computer to perform steps of the message expediting method as described above.

BRIEF DESCRIPTION OF THE DRAWINGS

The accompanying drawings, which are incorporated in and constitute a part of this specification, illustrate embodiments consistent with the present disclosure and together with the description, serve to explain the principles of the present disclosure.

In order to more clearly illustrate the embodiments of the present disclosure or the technical solutions in the related art, the accompanying drawings needed to be used in the description of the embodiments or the related art will be briefly introduced below. It will be apparent to those of ordinary skill in the art that other accompanying drawings may be obtained from these accompanying drawings without creative efforts.

FIGS. 14-20 are schematic diagrams of a terminal display interface for another whole process of a user expediting a target message provided in an embodiment of the present disclosure;

FIG. 21 is a schematic structural diagram of a message expediting apparatus in an embodiment of the present disclosure; and FIG. 22 is an exemplary block diagram of a system including at least one computing apparatus and at least one storage apparatus that stores instructions provided in an embodiment of the present disclosure.

DETAILED DESCRIPTION

In order to understand the above objects, features and advantages of the present disclosure more clearly, the solution of the present disclosure will be further described below. It should be noted that, as long as there is no conflict, the embodiments of the present disclosure and the features in the embodiments can be combined with each other.

Many specific details are set forth in the following description to fully understand the present disclosure, but the present disclosure can also be implemented in other ways different from those described here. Obviously, the embodiments in the description are only part of the embodiments of the present disclosure, but not all of them.

Figure 1:
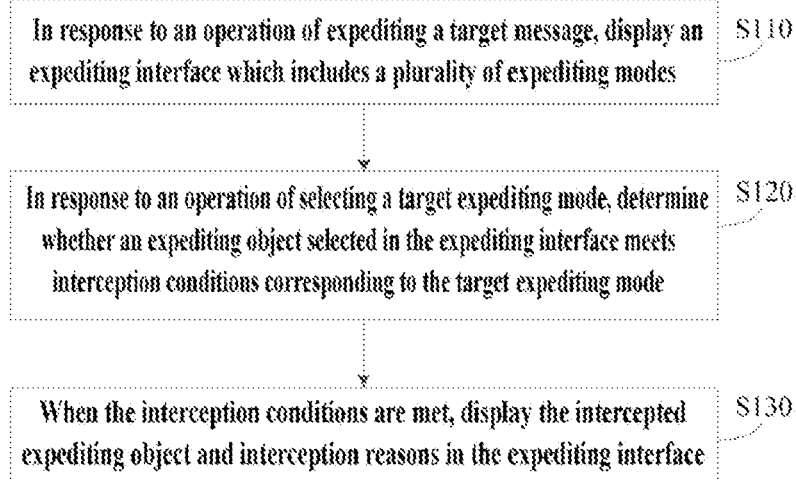
FIG. 1 is a flowchart of a message expediting method provided in an embodiment of the present disclosure.

FIG. 1 is a flowchart of a message expediting method provided in an embodiment of the present disclosure. This embodiment can be applied to the situation where a message expediting function is used in a client. The method can be executed by a message expediting apparatus, which can be implemented in the form of software and/or hardware and can be configured in electronic devices, such as terminals, including but not limited to a smartphone, a PDA, a tablet, a wearable device with a display, a desktop, a laptop, an all-in-one PC, a smart home device, etc.

As shown in FIG. 1, the method may specifically include:

S110, in response to an operation of expediting a target message, display an expediting interface which includes a plurality of expediting modes.

The operation of expediting a target message refers to an operation triggered by the user to set certain target information as an expediting message.

Optionally, the plurality of expediting modes include one or more of the following: in-app only, app+SMS, and app+phone call.

S120, in response to an operation of selecting a target expediting mode, determine whether an expediting object selected in the expediting interface meets interception conditions corresponding to the target expediting mode.

The operation of selecting a target expediting mode refers to an operation triggered by the user to select one of the plurality of expediting modes in the expediting interface as the target expediting mode.

The intercepting conditions refer to triggering conditions for restricting sending a target message to a certain expediting object.

In practice, there may be a plurality of interception conditions, and the present application does not limit this. Exemplarily, if the target expediting method is app+SMS or app+phone call, the interception conditions corresponding to the target expediting mode include at least one of the following: the expediting object crossing domains, the expediting object being an external non-friend, and the information of the expediting object being incomplete.

"The expediting object crossing domains" refers to that one of the target message sender and the expediting object uses SaaS (Software-as-a-Service), and the other uses a privatized application; or, the target message sender and the expediting object are in different regions.

"The expediting object being an external non-friend" refers to that in an external group scenario, expediting SMS/phone calls can only be sent to the same tenant or external friends.

"The information of the expediting object being incomplete" includes but is not limited to that the information of a recipient is incomplete, such as the recipient's name is empty or the recipient's phone number is empty.

In some embodiments, an implementation mode for determining whether an expediting object selected in the expediting interface meets interception conditions corresponding to the target expediting mode is as follows:

Firstly, acquire client information of the selected expediting object, where the client information includes one or more of the following: client deployment information, client location information, and client registration information.

Secondly, determine, based on the client information, whether the interception conditions corresponding to the target expediting mode are met.

In some embodiments, it is determined, based on the client deployment information, whether deployment domains are crossed; and if so, it is determined that the interception conditions corresponding to the SMS or phone call expediting mode are met. For example, if the client of the target message sender adopts SaaS deployment, while and the client of the expediting object adopts privatized deployment, it is determined that the interception conditions corresponding to the SMS or phone call expediting mode are met.

It is determined, based on the client location information, whether domains are crossed; and if so, it is determined that the interception conditions corresponding to the SMS or phone call expediting mode are met.

It is determined, based on the client registration information, whether the selected expediting object is an external non-friend; and if so, it is determined that the interception conditions corresponding to the SMS or phone call expediting mode are met. For example, if the expediting object is in an external group, that is, the expediting object and the target message sender belong to the same group, but the expediting object and the target message sender neither belong to the same tenant nor are they friends, it is determined that the expediting object is an external non-friend.

It is determined, based on the client registration information, whether the registration information is missing a phone number; and if so, it is determined that the interception conditions corresponding to the SMS or phone call expediting mode are met.

S130, display the intercepted expediting object and interception reasons in the expediting interface.

According to the above technical solution, the intercepted expediting object and the interception reasons being displayed in the expediting interface can ensure that a sender of an expediting message is notified in a timely manner of the failure to send the expediting message, which is helpful in ensuring that the sender takes other measures in a timely manner, so as to improve the collaboration efficiency with others.

There are many specific implementation modes of S130, which are not limited in the present application. Three specific implementation modes are given as examples below. In practice, one or more of the implementation modes can be selected during the execution of S130.

Figure 2:
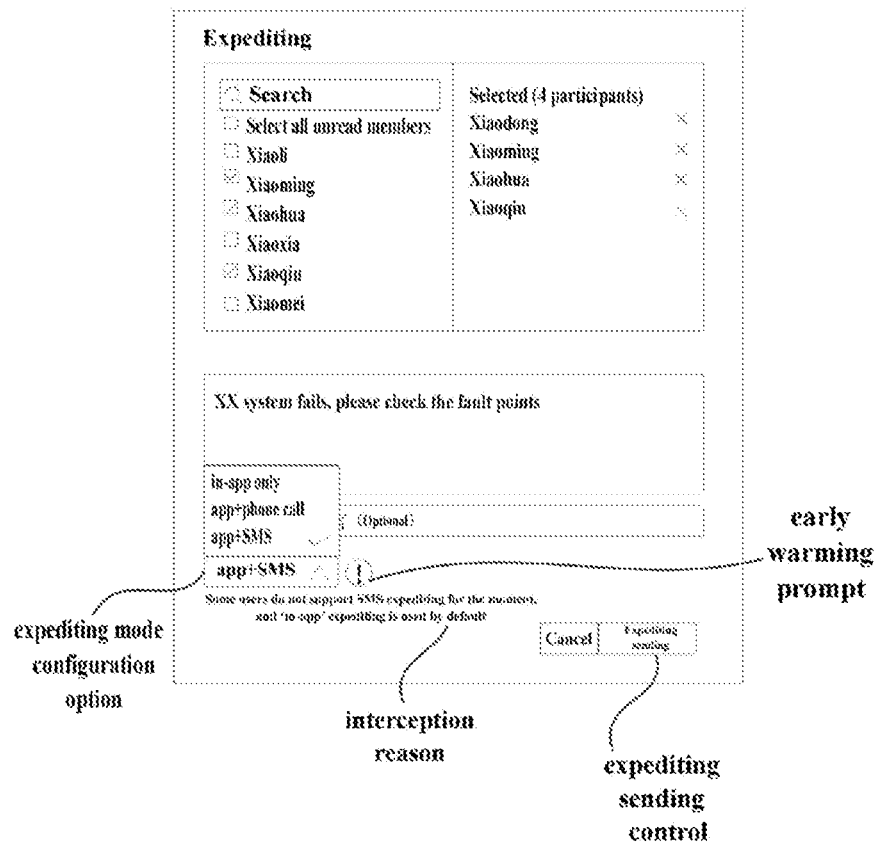
FIG. 2 is a schematic diagram of an expediting interface provided in the present disclosure.

The first implementation mode is to display an early warning prompt in a display area of the plurality of expediting modes; and in response to an operation of a mouse pointer hovering over the early warning prompt, display at least one interception reason. Exemplarily, FIG. 2 is a schematic diagram of an expediting interface provided in the present disclosure. Referring to FIG. 2, it is assumed that the expediting target Xiaodong has an empty phone number and thus meets the interception conditions corresponding to the "app+SMS" expediting mode, an early warning prompt is displayed next to the expediting mode configuration option. When the user hovers the mouse pointer over the early warning prompt, the interception reasons such as "some users not support SMS expediting for the moment" or "Xiaodong not support SMS expediting for the moment" are displayed.

Figure 3:
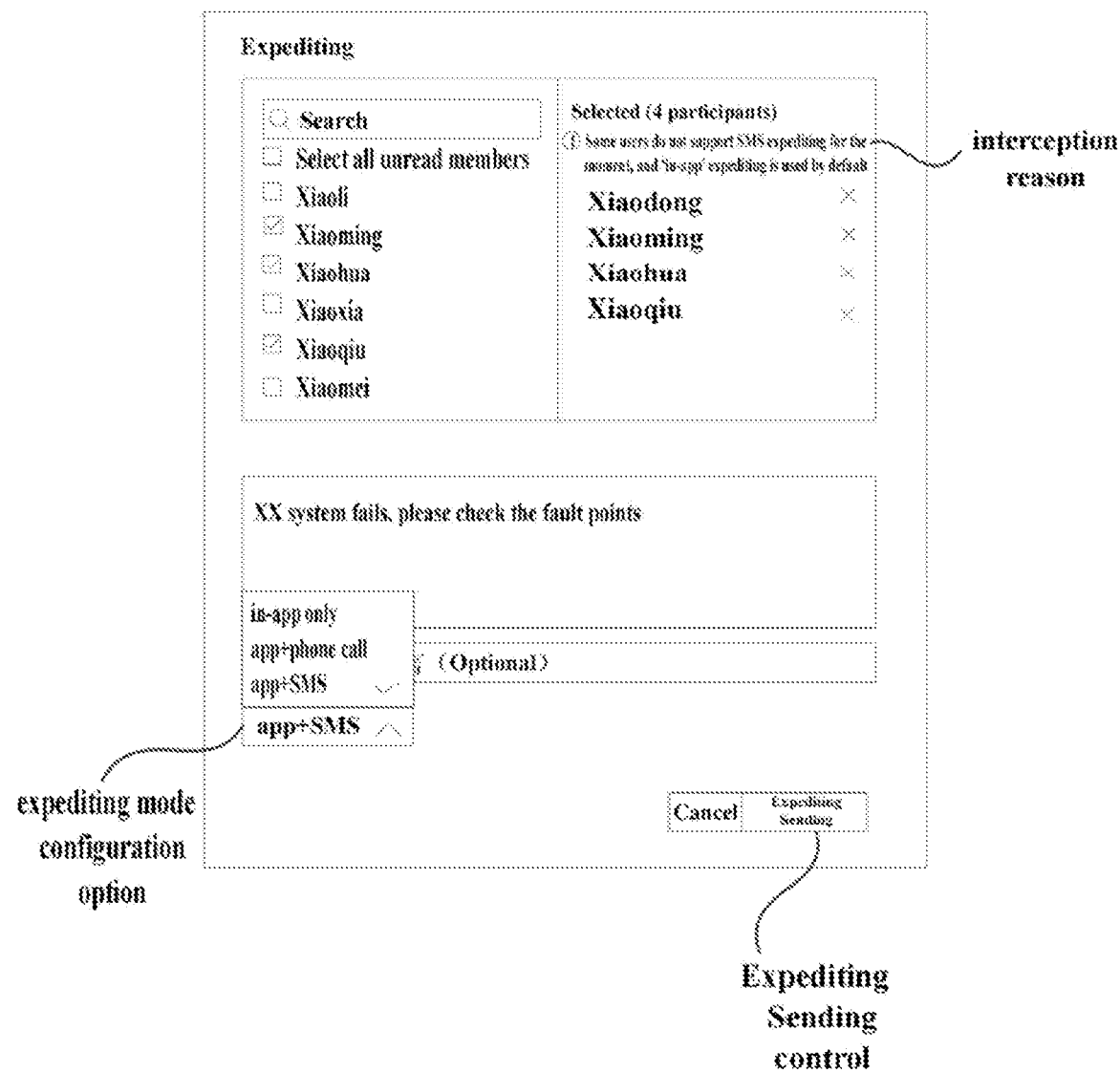
FIG. 3 is a schematic diagram of another expediting interface provided in the present disclosure.

The second implementation mode is to display, within the selected area in the expediting interface, at least one interception reason at the top and display the intercepted expediting objects first. FIG. 3 is a schematic diagram of another expediting interface provided in the present disclosure. Exemplarily, referring to FIG. 3, it is assumed that the expediting target Xiaodong has an empty phone number and thus meets the interception conditions corresponding to the "app+SMS" expediting mode, the interception reason "some users not support SMS expediting for the moment" is displayed at the top within the selected area in the expediting interface, and in a selected list, Xiaodong's position is placed at the top of the list.

Figure 4:
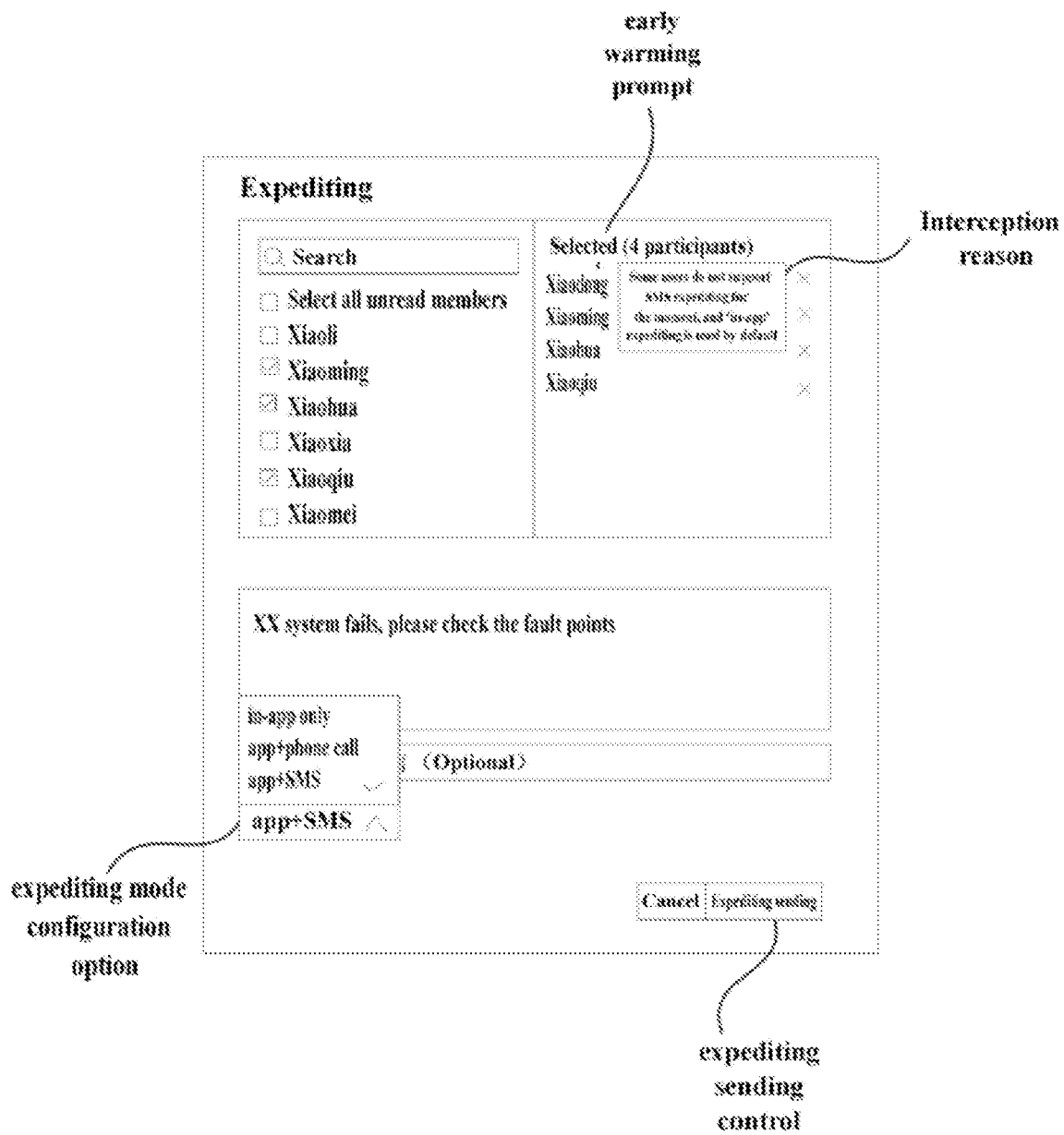
FIG. 4 is a schematic diagram of another expediting interface provided in the present disclosure.

The third implementation mode is to display the intercepted expediting object in the expediting interface, display the early warning prompt on an icon of the intercepted expediting object, and in response to the operation of the mouse pointer hovering over the early warning prompt, display the interception reasons of the intercepted expediting object. FIG. 4 is a schematic diagram of another expediting interface provided in the present disclosure. Exemplarily, it is assumed that the expediting target Xiaodong has an empty phone number and thus meets the interception conditions corresponding to the "app+SMS" expediting mode, and the early warning prompt is displayed on the icon (such as an avatar icon or a name icon) corresponding to Xiaodong, referring to the selected list in FIG. 4. When the user hovers the mouse pointer over the early warning prompt, the interception reasons such as "some users not support SMS expediting for the moment" are displayed.

Further, when displayed, the interception reasons can be further refined, for example, the expediting object does not support SMS expediting because of which interception conditions it meets.

Further, when the interception reason are displayed, the subsequent processing modes can also be displayed together, such as "'in-app' expediting is used by default".

Further, if the interception reasons of different intercepted expediting objects are different, the display priority of the interception reasons is: the expediting objects crossing domains, the expediting objects being external non-friends, and the information of the expediting objects being incomplete. Exemplarily, if three people A, B, and C all meet the interception conditions corresponding to the target expediting mode, the interception reason of A is the expediting objects crossing domains, and the interception reason of B is the expediting objects being external non-friends. The interception reasons are displayed as "some users not support SMS expediting for the moment due to the expediting objects crossing domains". Or, the interception reasons are displayed as "A not support SMS expediting for the moment due to the expediting objects crossing domains, and B not support SMS expediting for the moment due to the expediting objects being external non-friends".

And/or, if there are a plurality of interception reasons for the same intercepted expediting object, only the interception reason with the highest priority is displayed for the intercepted expediting object. Exemplarily, if the interception reasons of D are the expediting objects crossing domains and the expediting objects being external non-friends, the interception reasons are displayed as "D not support SMS expediting for the moment due to the expediting objects crossing domains".

On the basis of the above technical solutions, optionally, the expediting interface also includes an expediting sending control, and the method also includes: in response to an operation of triggering the expediting sending control, sending the target message to the selected expediting object; and if the sending fails, performing one or more of the following: prompting an expediting failure message by means of an online pop-up window; prompting an expediting failure by means of voice; and pushing an expediting failure message card in an offline terminal. Such setting can further ensure that a sender of an expediting message is notified in a timely manner of the failure to send the expediting message, which is helpful in ensuring that the sender takes other measures in a timely manner, so as to improve the collaboration efficiency with others.

Further, while prompting an expediting failure message by means of an online pop-up window, a view details control is displayed in the pop-up window; and in response to an operation of triggering the view details control, expediting failure information is jumped to; the expediting failure message card pushed in the offline terminal includes a title and content, and the message card also includes the view details control; and in response to the operation of triggering the view details control, the expediting failure information is jumped to. In this way, the user can further learn, by means of the view details control, content related to an expediting message that fails to be sent.

For ease of understanding, the following explains the whole process of message expediting using a PC version of instant messaging application and the whole process of message expediting using a mobile version of instant messaging application.

The PC version of instant messaging applications is used for message expediting.

Figure 5:
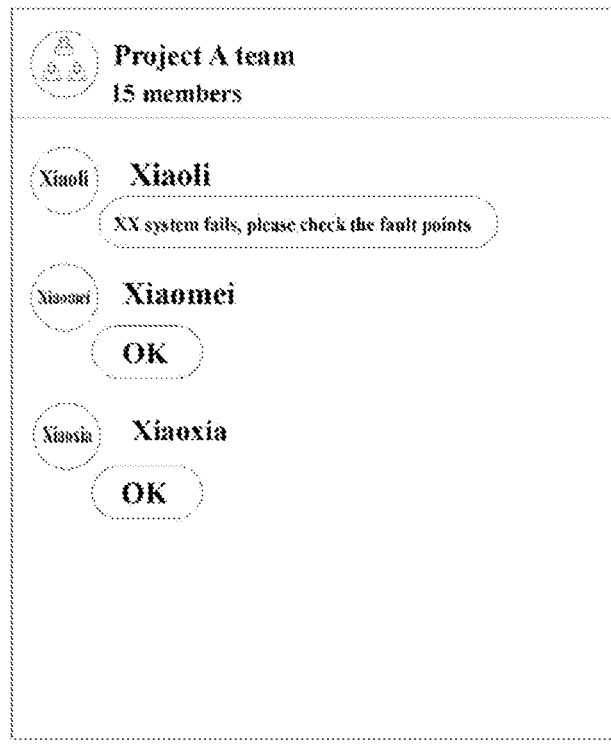
FIGS. 5-13 are schematic diagrams of a terminal portion display interface for the whole process of a user expediting a target message provided in an embodiment of the present disclosure.
Figure 6:
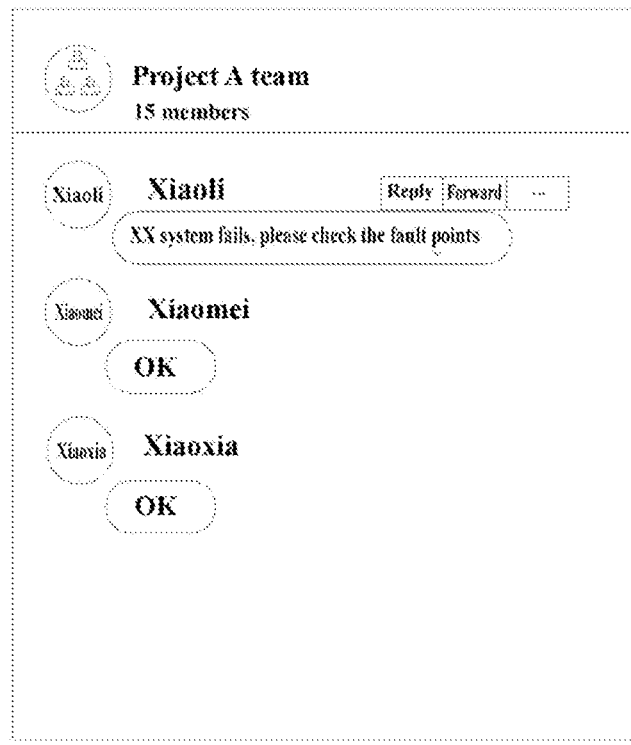
Figure 7:
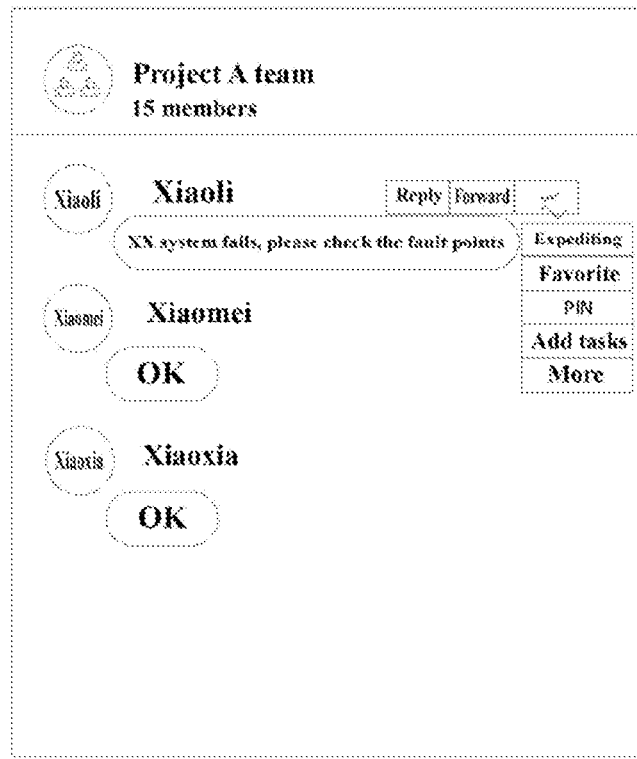
Figure 8:
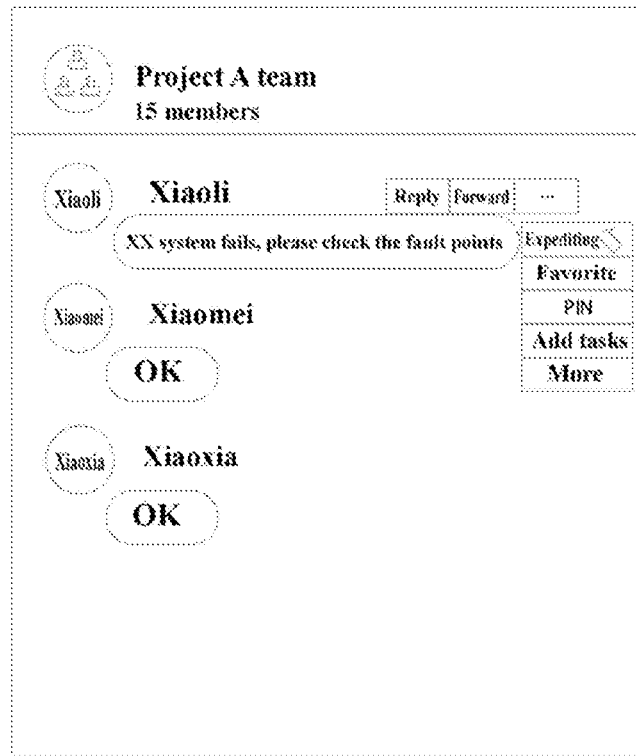

Exemplarily, FIGS. 5-13 are schematic diagrams of a terminal portion display interface for the whole process of a user expediting a target message provided in an embodiment of the present disclosure. Referring to FIG. 5, Xiaoli sends a message that "XX system fails, please check the fault points" to a project A team containing 15 people. However, in the project team, only Xiaomei and Xiaoxia reply "ok", indicating that they are aware of the message, and the others do not reply. At this time, Xiaoli can use the message expediting function to further remind the others to check the message that "XX system fails, please check the fault points". Referring to FIGS. 6-8, when the message expediting function is used, that "XX system fails, please check the fault points" is the target message, and Xiaoli can hover the mouse over the target message and click the floating " . . . ">"expediting" on the right side of the message. In response to Xiaoli's operation of expediting the target message, the expediting interface is displayed.

Figure 9:
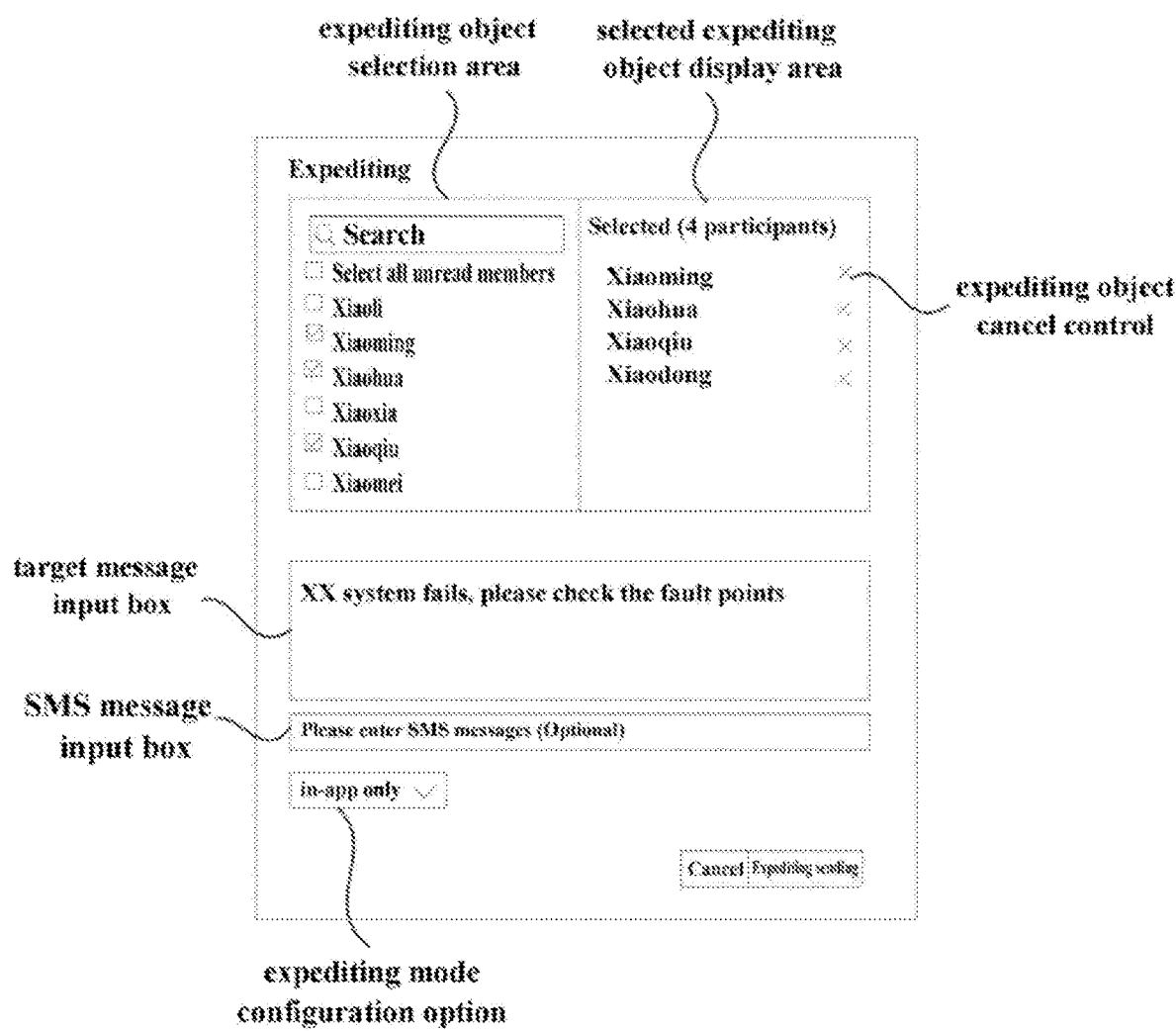
Figure 10:
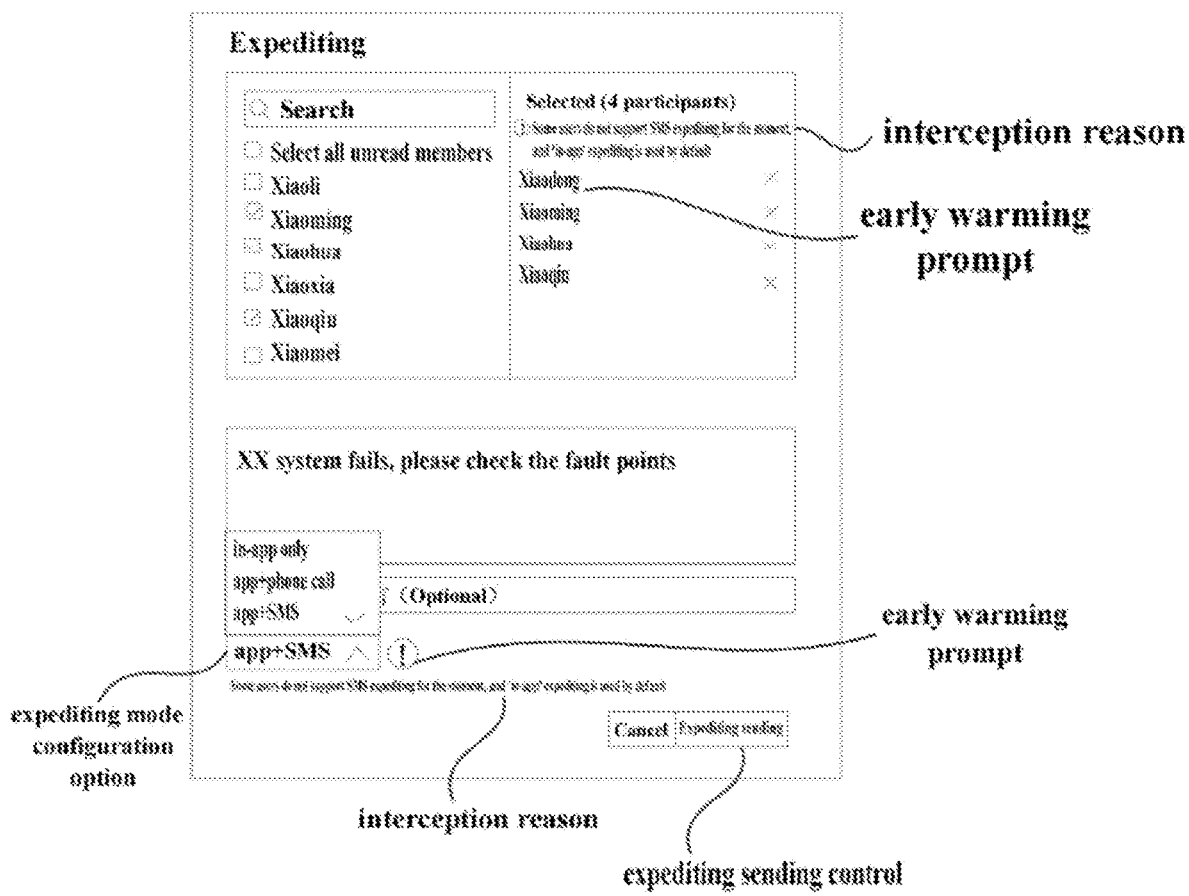

Referring to FIGS. 9 and 10, the expediting interface includes an expediting object selection area, a selected expediting object display area, a target message input box, an SMS message input box, an expediting mode configuration option, an expediting sending control, and a cancel control.

Members who can be taken as expediting objects are displayed in the expediting object selection area. The members can be all or part of the members of a session (i.e., the project A team) in FIG. 5, or can also be members of a session (i.e., a non-project A team) other than those in FIG. 5. Further, in order to facilitate the user to quickly select an expediting object, the expediting object selection area is also provided with an option of selecting all unread members. If the user selects the option of selecting all unread members, all members in the project A team who have not read the target message are taken as expediting objects. The expediting object selection area is also provided with a search box to help the users quickly find the members needed.

In the selected expediting object display area, the selected members who are taken as expediting objects are displayed in the form of a list. In FIGS. 9 and 10, an expediting object cancel control is provided on the right side of each expediting object, and the user can delete the expediting objects corresponding to the clicked controls by clicking the expediting object cancel controls. After deletion, the members are no longer expediting objects.

The target message input box is used to enter or modify the target message.

The SMS message input box allows to enter SMS messages in the "app+SMS" expediting mode.

The expediting mode configuration option is used to provide the user with a plurality of expediting modes, one of which the user can select. If the user clicks on the expediting mode configuration option, as shown in FIG. 10, all expediting modes can be further displayed. The user selects the "app+SMS" option and uses "app+SMS" as the expediting mode needed.

Since the expediting target Xiaodong has an empty phone number and thus meets the interception conditions corresponding to the "app+SMS" expediting mode, the early warning prompt is displayed next to the expediting mode configuration option in the expediting display in FIG. 10. Xiaodong's position is placed at the top of the selected expediting objects list, and the early warning prompt is also displayed on the corresponding icon of Xiaodong. Moreover, within the selected area in the expediting interface, the interception reason "some users not support SMS expediting for the moment, and 'in-app' expediting is used by default"

is displayed at the top. When the user hovers the mouse pointer over the early warning prompt (including the early warning prompt next to the expediting mode configuration option and the early warning prompt on the corresponding icon of Xiaodong), the interception reason "some users not support SMS expediting for the moment, and 'in-app' expediting is used by default" is displayed.

When the user clicks on the cancel control, the operation of expediting the target message this time can be canceled.

After the user configures the above items and clicks on the expediting sending control, the target message is sent to the selected expediting object (i.e., the expediting object displayed in the selected expediting object display area).

Figure 11:
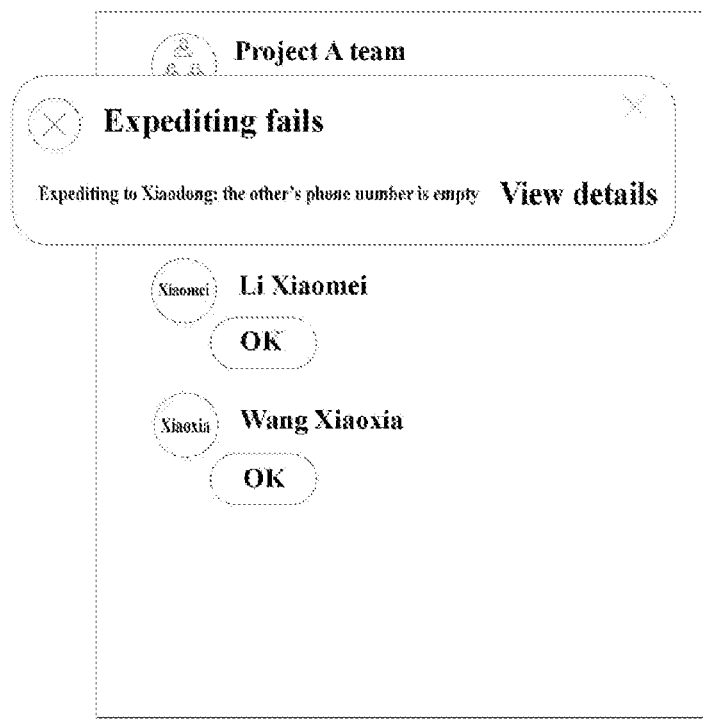
Figure 12:
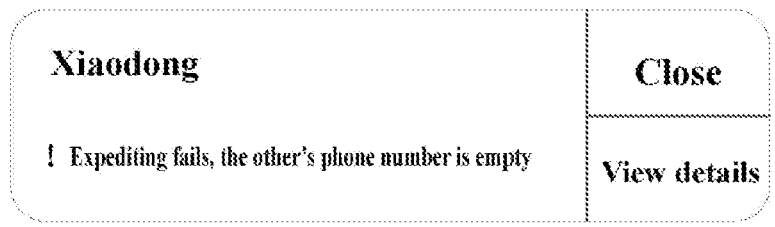
Figure 13:
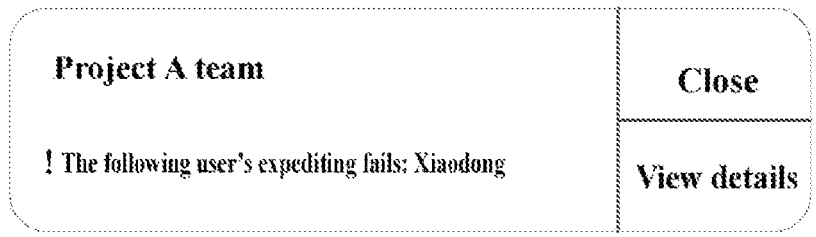

Since Xiaodong meets the interception conditions corresponding to the "app+SMS" expediting mode, a message of a sending failure needs to be fed back to an expediting message sender. Referring to FIG. 11, if the user terminal display interface is displaying the instant messaging interface, an expediting failure message is prompted by means of an online pop-up window; at the same time, the view details control is displayed in the pop-up window. If the user clicks on the view details control, the display interface can jump to expediting failure information, that is, the target message. If the user terminal display interface does not display the instant messaging interface, an expediting failure message card is pushed in an offline terminal. The message card includes a title and content. Exemplarily, the title of the message card in FIG. 12 is "Xiaodong", and the content is that "! The expediting fails, the other's phone number is empty". The title of the message card in FIG. 13 is "project A team", and the content is that "! The following user's expediting fails: Xiaodong". The message card also includes the view details control. If the user clicks on the view details control, the display interface can jump to the expediting failure information, that is, the target message.

The mobile version of instant messaging application is used for message expediting.

Figure 14:
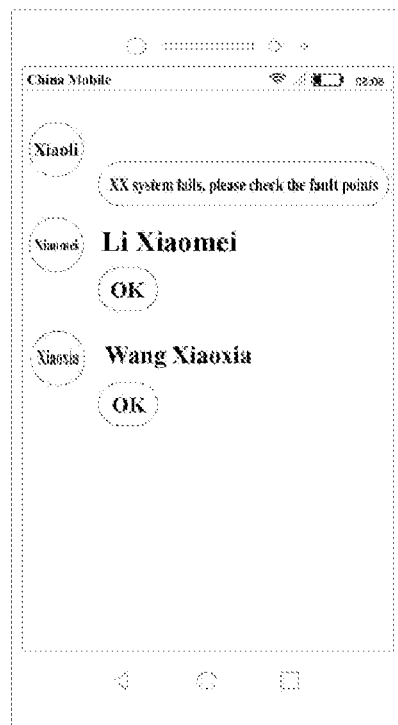
Figure 15:
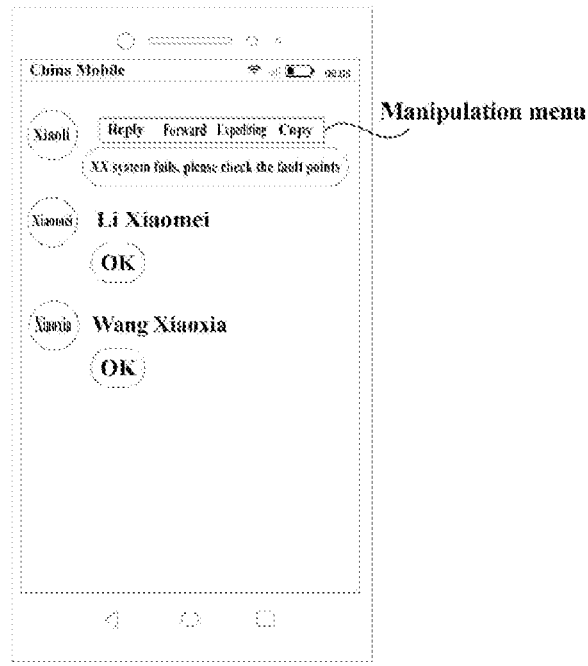
Figure 16:
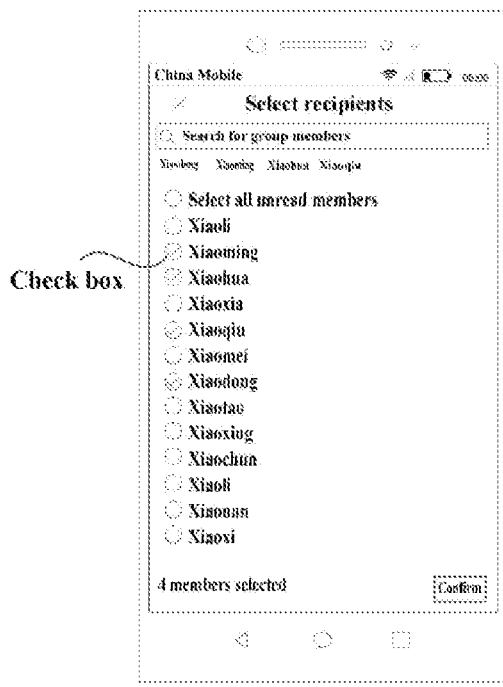

Exemplarily, FIGS. 14-20 are schematic diagrams of a terminal portion display interface for another whole process of a user expediting a target message provided in an embodiment of the present disclosure. Referring to FIG. 14, Xiaoli sends a message that "XX system fails, please check the fault points" to a project A team containing 15 people. However, in the project team, only Xiaomei and Xiaoxia reply "ok", indicating that they are aware of the message, and the others do not reply. At this time, Xiaoli can use the message expediting function to further remind the others to check the message that "XX system fails, please check the fault points". Referring to FIG. 15, when the message expediting function is used, that "XX system fails, please check the fault points" is the target message, Xiaoli can long press the target message, and the terminal displays an operation menu that can operate on the target message. This operation menu includes expediting, and Xiaoli clicks "expediting". In response to Xiaoli's operation of expediting the target message, as shown in FIG. 16, the expediting interface is displayed.

Figure 17:
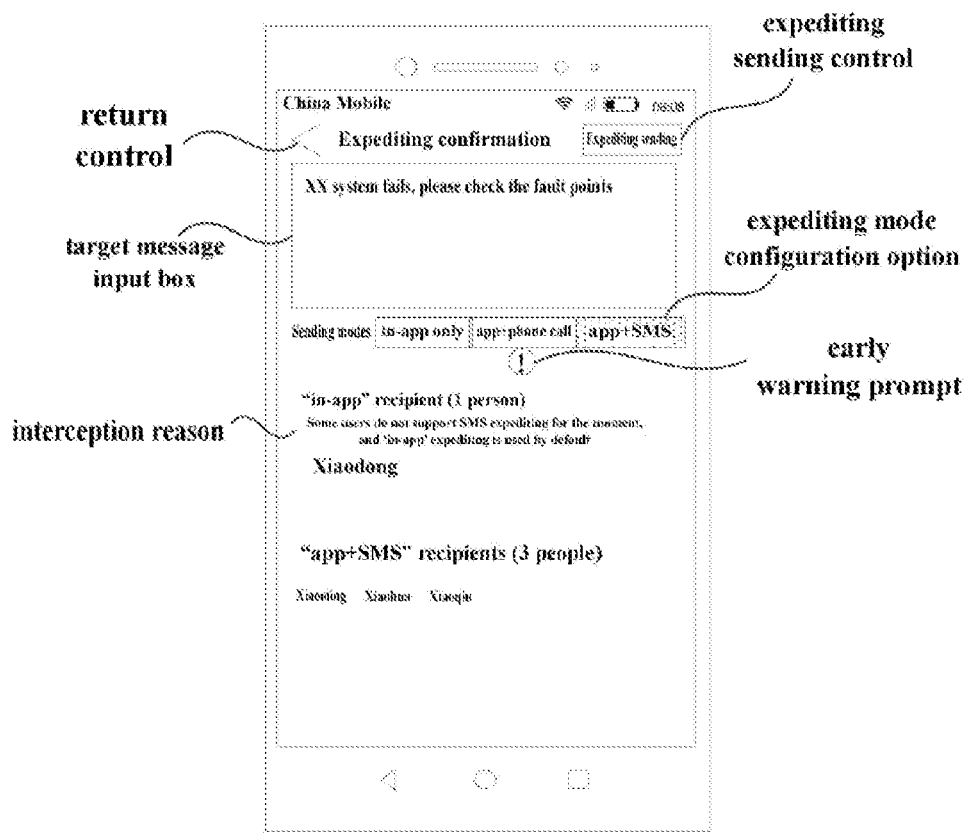

In the mobile version, the expediting interface includes an expediting interface 1 and an expediting interface 2. FIG. 16 shows the expediting interface 1, which is used to select an expediting object. FIG. 17 shows the expediting interface 2, which is used to set an expediting mode and a target message.

Members who can be taken as expediting objects are displayed in the expediting interface 1. The members can be all or part of the members of a session (i.e., the project A team), or can also be others of a session (i.e., a non-project A team). Further, in order to facilitate the user to quickly select an expediting object, the expediting object selection area is also provided with an option of selecting all unread members. If the user selects the option of selecting all unread members, all members in the project A team who have not read the target message are taken as expediting objects. The expediting object selection area is also provided with a search box to help the users quickly find the members needed. All members displayed in expediting interface 1 are provided with check boxes, and the user can select an expediting object or cancel the operation by clicking on the check boxes.

The expediting interface 2 includes a target message input box, an expediting mode configuration option, an expediting sending control and a return control. The target message input box is used to enter or modify the target message. The expediting mode configuration option is used to provide the user with a plurality of expediting modes, one of which the user can select. As shown in FIG. 17, the user selects the "app+SMS" option and uses "app+SMS" as the expediting mode needed.

Since the expediting target Xiaodong has an empty phone number and thus meets the interception conditions corresponding to the "app+SMS" expediting mode, the early warning prompt is displayed next to the expediting mode configuration option in the expediting display in FIG. 17. Moreover, two display areas are displayed below the expediting mode configuration option, where the first display area is used to display "in-app" recipient summary results, as well as the interception reason "some users not support SMS expediting for the moment, and 'in-app' expediting is used by default", and the second display area displays "app+SMS" recipient summary results.

When the user clicks on the return control, the expediting interface 1 in FIG. 16 can be returned to. When the user clicks on the expediting sending control, the target message is sent to the selected expediting object.

Figure 18:
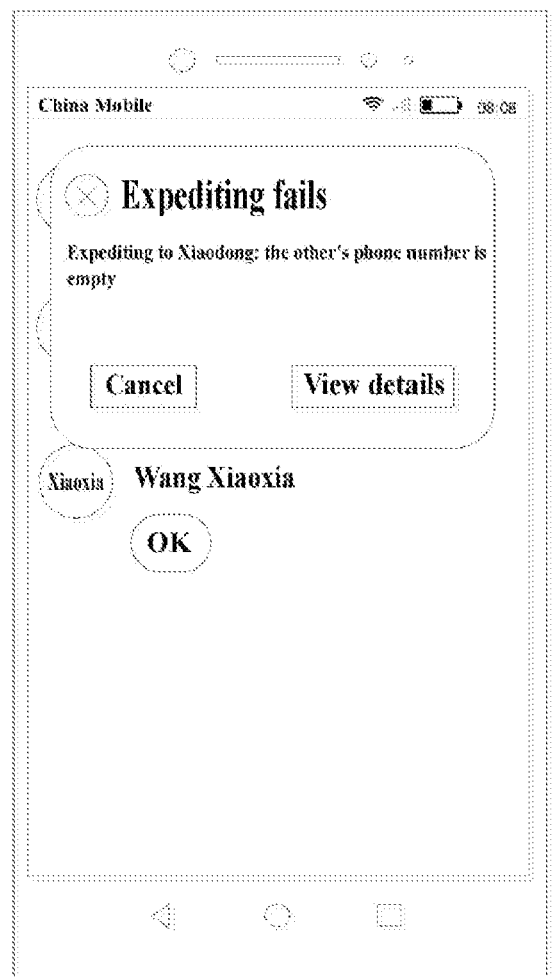
Figure 19:
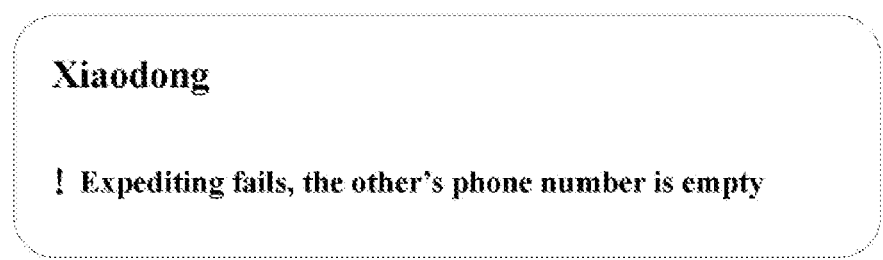

Since Xiaodong meets the interception conditions corresponding to the "app+SMS" expediting mode, a message of a sending failure needs to be fed back to an expediting message sender. Referring to FIG. 18, if the user terminal display interface is displaying the instant messaging interface, an expediting failure message is prompted by means of an online pop-up window; at the same time, the view details control is displayed in the pop-up window. If the user clicks on the view details control, the display interface can jump to expediting failure information, that is, the target message. If the user terminal display interface does not display the instant messaging interface, an expediting failure message card is pushed in an offline terminal. The message card includes a title and content. Exemplarily, the title of the message card in FIG. 19 is "Xiaodong", and the content is that "! The expediting fails, the other's phone number is empty". The title of the message card in FIG. 20 is "project A team", and the content is that "! The following user's expediting fails: Xiaodong". The user can click the message card to make the display interface jump to a screen including expediting failure information (i.e., the target message).

On the basis of the above technical solutions, optionally, an expediting mode is set to have an upper limit on the number of expediting objects. When the number of expediting objects selected by the user is greater than the upper limit of the number of expediting objects corresponding to the expediting mode selected, upper limit-exceeding prompt information is displayed. Exemplarily, the upper limit-exceeding prompt information may be "exceeding the expediting upper limit".

It should be noted that for simple description, the foregoing method embodiments are expressed as a series of action combinations. However, those skilled in the art should learn that the present disclosure is not limited by the described action sequence, because in accordance with the present disclosure, certain steps may be performed in other orders or simultaneously. Secondly, those skilled in the art should also learn that the embodiments described in the specification are all preferred embodiments, and the actions and modules involved are not necessarily necessary for the present disclosure.

FIG. 21 is a schematic structural diagram of a message expediting apparatus in an embodiment of the present disclosure. The message expediting apparatus provided in the embodiment of the present disclosure can be configured in a client. Referring to FIG. 21, the message expediting apparatus specifically includes:

a first display unit 210, which is used for displaying, in response to an operation of expediting a target message, an expediting interface which includes a plurality of expediting modes;

a determination unit 220, which is used for determining, in response to an operation of selecting a target expediting mode, whether an expediting object selected in the expediting interface meets interception conditions corresponding to the target expediting mode; and a second display unit 230, which is used for displaying, when the interception conditions are met, the intercepted expediting object and interception reasons in the expediting interface.

Further, the plurality of expediting modes include:
in-app only, app+SMS, and app+phone call.

Further, if the target expediting mode is app+SMS or app+phone call, the interception conditions corresponding to the target expediting mode include at least one of the following:

the expediting object crossing domains, the expediting object being an external non-friend, and the information of the expediting object being incomplete.

Further, the determination unit 220 is used for:

acquiring client information of the selected expediting object, where the client information includes one or more of the following: client deployment information, client location information, and client registration information; and determining, based on the client information, whether the interception conditions corresponding to the target expediting mode are met.

Further, the determination unit 220 is used for:

determining, based on the client deployment information, whether deployment domains are crossed; and if so, determining that the interception conditions corresponding to the SMS or phone call expediting mode are met;

determining, based on the client location information, whether domains are crossed; and if so, determining that the interception conditions corresponding to the SMS or phone call expediting mode are met;

determining, based on the client registration information, whether the selected expediting object is an external non-friend; and if so, determining that the interception conditions corresponding to the SMS or phone call expediting mode are met; and determining, based on the client registration information, whether the registration information is missing a phone number; and if so, determining that the interception conditions corresponding to the SMS or phone call expediting mode are met.

Further, the second display unit 230 is used for executing one or more of the following modes:

displaying an early warning prompt in a display area of the plurality of expediting modes; and in response to an operation of a mouse pointer hovering over the early warning prompt, displaying at least one interception reason;

within the selected area in the expediting interface, displaying at least one interception reason at the top and displaying the intercepted expediting objects first; and displaying the intercepted expediting object in the expediting interface, displaying the early warning prompt on an icon of the intercepted expediting object, and in response to the operation of the mouse pointer hovering over the early warning prompt, displaying the interception reasons of the intercepted expediting object.

Further, if the interception reasons of different intercepted expediting objects are different, the display priority of the interception reasons is: the expediting objects crossing domains, the expediting objects being external non-friends, and the information of the expediting objects being incomplete;

and/or, if there are a plurality of interception reasons for the same intercepted expediting object, only the interception reason with the highest priority is displayed for the intercepted expediting object.

Further, the expediting interface also includes an expediting sending control, and the apparatus also includes a sending unit, where the sending unit is used for:

in response to an operation of triggering the expediting sending control, sending the target message to the selected expediting object; and if the sending fails, performing one or more of the following:

prompting an expediting failure message by means of an online pop-up window;

prompting an expediting failure by means of voice; and pushing an expediting failure message card in an offline terminal.

Further, while prompting an expediting failure message by means of an online pop-up window, a view details control is displayed in the pop-up window; and the sending unit is also used for, in response to an operation of triggering the view details control, jumping to expediting failure information;

the expediting failure message card pushed in the offline terminal includes a title and content, and the message card also includes the view details control; and the sending unit is also used for, in response to the operation of triggering the view details control, jumping to the expediting failure information.

The message expediting apparatus provided in the embodiment of the present disclosure can execute the steps performed by the client in the message expediting method provided in the method embodiments of the present disclosure, and has execution steps and beneficial effects, which will not be described again here.

In some embodiments, the division of various units in the message expediting apparatus is only a logical function division. In actual implementation, there may be other division methods that, for example, at least two units in the message expediting apparatus may be implemented as one unit, and each unit in the message expediting apparatus may also be divided into a plurality of sub-units. It can be understood that each unit or sub-unit can be implemented as electronic hardware, or a combination of computer software and electronic hardware. Whether these functions are performed in hardware or software depends on the specific application and design constraints of the technical solutions. Those skilled in the art may use different methods for each specific application to implement the described functionality.

FIG. 22 is an exemplary block diagram of a system including at least one computing apparatus and at least one storage apparatus that stores instructions provided in an embodiment of the present disclosure. In some embodiments, the system can be used for big data processing, and the at least one computing apparatus and at least one storage apparatus can be deployed in a distributed manner, making the system a distributed data processing cluster.

As shown in FIG. 22, the system includes: at least one computing apparatus 51 and at least one storage apparatus 52 that stores instructions. It can be understood that the storage apparatus 52 in this embodiment may be a volatile memory or a non-volatile memory, or may include both volatile and non-volatile memories.

In some embodiments, the storage apparatus 52 stores the following elements, executable units or data structures, or subsets thereof, or extension sets thereof: an operating system and applications.

The operating system includes various system programs, such as a framework layer, a core library layer, a driver layer, etc., which are used to implement various basic tasks and process hardware-based tasks. The applications contain various applications, such as a media player, a browser, etc., which are used to implement various application tasks. A program that implements the message expediting method provided in the embodiment of the present disclosure may be contained in the applications.

In the embodiment of the present disclosure, by calling the programs or instructions, which can specifically be programs or instructions stored in the applications, that are stored in the at least one storage apparatus 52, the at least one computing apparatus 51 is used for performing the steps in various embodiments of the message expediting method provided in the embodiment of the present disclosure.

The message expediting method provided in the embodiment of the present disclosure can be applied to the computing apparatus 51 or implemented by the computing apparatus 51. The computing apparatus 51 may be an integrated circuit chip with a signal processing capability. In the process of implementation, each step of the above method can be completed by instructions in the form of hardware integrated logic circuits or software in the computing apparatus 51. The above computing apparatus 51 may be a general-purpose processor, a digital signal processor (DSP), an application specific integrated circuit (ASIC), a field programmable gate array (FPGA) or other programmable logic device, discrete gate or transistor logic device, and discrete hardware component. The general-purpose processor may be a microprocessor or the processor may also be any conventional processor, etc.

The steps of the message expediting method provided in the embodiment of the present disclosure can be directly executed by a hardware decoding processor, or executed by a combination of hardware and software units in the decoding processor. The software units can be located in a random access memory, a flash memory, a read-only memory, a programmable read-only memory or an electrically erasable programmable memory, a register and other mature storage media in this field. The storage media are located in the storage apparatus 52, and the computing apparatus 51 reads information in the storage apparatus 52 and completes the steps of the method in combination with its hardware.

Embodiments of the present disclosure also provide a computer-readable storage medium storing programs or instructions which, when executed by the at least one computing apparatus, cause the at least one computing apparatus to perform steps in various embodiments of the message expediting method. To avoid repeated description, the details will not be described again here. The computing apparatus may be the computing apparatus 51 shown in FIG. 5. In some embodiments, the computer-readable storage medium is a non-transitory computer-readable storage medium.

Embodiments of the present disclosure also provide a computer program product, where the computer program product includes a computer program which is stored in a non-transitory computer-readable storage medium, and at least one processor of the computer reads, from the storage medium, and executes the computer program to cause the computer to perform the steps in various embodiments of the message expediting method. In order to avoid repeated description, the details will not be described again here.

Embodiments of the present disclosure also provide a computer program product including program code which when executed by the computer, causes the computer to perform the steps in various embodiments of the message expediting method.

It should be noted that, in this document, terms "including", "containing" or any other variations thereof are intended to cover a non-exclusive inclusion, such that a process, method, article or apparatus that includes a series of elements not only includes those elements, but also includes other elements not expressly listed, or inherent elements in the process, method, article or apparatus. Without further limitation, an element defined by the statement "includes . . . " does not exclude the presence of other identical elements in the process, method, article or apparatus including the element.

Those skilled in the art can understand that, although some embodiments described herein include certain features included in other embodiments but not others, combinations of features of different embodiments are meant to be within the scope of the present disclosure and form different embodiments.

Those skilled in the art can understand that the description of each embodiment has its own emphasis. Parts that are not described in detail in a certain embodiment can refer to the relevant descriptions of other embodiments.

Although the embodiments of the present disclosure are described in conjunction with the accompanying drawings, those skilled in the art can make various modifications and variations without departing from the spirit and scope of the present disclosure, and such modifications and variations all fall within the scope defined by the appended claims.

What is claimed is:

1. A message expediting method, comprising:
   in response to an operation of expediting a target message, displaying an expediting interface which comprises a plurality of expediting modes;
   in response to an operation of selecting a target expediting mode, determining whether an expediting object selected in the expediting interface meets interception conditions corresponding to the target expediting mode; and when the interception conditions are met, displaying the intercepted expediting object and interception reasons in the expediting interface, wherein the plurality of expediting modes comprise one or more of the following: in-app only, app+SMS, and app+phone call.

2. The method according to claim 1, wherein if the target expediting mode is app+SMS or app+phone call, the interception conditions corresponding to the target expediting mode comprise at least one of the following:

the expediting object crossing domains, the expediting object being an external non-friend, and the information of the expediting object being incomplete.

3. The method according to claim 2, wherein if the interception reasons of different intercepted expediting objects are different, the display priority of the interception reasons is: the expediting objects crossing domains, the expediting objects being external non-friends, and the information of the expediting objects being incomplete; and/or, if there are a plurality of interception reasons for the same intercepted expediting object, only the interception reason with the highest priority is displayed for the intercepted expediting object.

4. The method according to claim 1, wherein determining whether an expediting object selected in the expediting interface meets interception conditions corresponding to the target expediting mode comprises:

acquiring client information of the selected expediting object, wherein the client information comprises one or more of the following: client deployment information, client location information, and client registration information; and determining, based on the client information, whether the interception conditions corresponding to the target expediting mode are met.

5. The method according to claim 4, wherein determining, based on the client information, whether the interception conditions corresponding to the target expediting mode are met comprises:

determining, based on the client deployment information, whether deployment domains are crossed; and if so, determining that the interception conditions corresponding to the SMS or phone call expediting mode are met;

determining, based on the client location information, whether domains are crossed; and if so, determining that the interception conditions corresponding to the SMS or phone call expediting mode are met;

determining, based on the client registration information, whether the selected expediting object is an external non-friend; and if so, determining that the interception conditions corresponding to the SMS or phone call expediting mode are met; and determining, based on the client registration information, whether the registration information is missing a phone number; and if so, determining that the interception conditions corresponding to the SMS or phone call expediting mode are met.

6. The method according to claim 1, wherein displaying the intercepted expediting object and interception reasons in the expediting interface comprises one or more of the following:

displaying an early warning prompt in a display area of the plurality of expediting modes; and in response to an operation of a mouse pointer hovering over the early warning prompt, displaying at least one interception reason;

within the selected area in the expediting interface, displaying at least one interception reason at the top and displaying the intercepted expediting objects first; and displaying the intercepted expediting object in the expediting interface, displaying the early warning prompt on an icon of the intercepted expediting object, and in response to the operation of the mouse pointer hovering over the early warning prompt, displaying the interception reasons of the intercepted expediting object.

7. The method according to claim 1, wherein the expediting interface also comprises an expediting sending control, and the method also comprises:

in response to an operation of triggering the expediting sending control, sending the target message to the selected expediting object; and if the sending fails, performing one or more of the following:

prompting an expediting failure message by means of an online pop-up window;

prompting an expediting failure by means of voice; and pushing an expediting failure message card in an offline terminal.

8. The method according to claim 7, wherein while prompting an expediting failure message by means of an online pop-up window, a view details control is further displayed in the pop-up window; and in response to an operation of triggering the view details control, expediting failure information is jumped to;

the expediting failure message card pushed in the offline terminal comprises a title and content, and the message card also comprises the view details control; and in response to the operation of triggering the view details control, the expediting failure information is jumped to.

9. A system comprising at least one computing apparatus and at least one storage apparatus that stores instructions, wherein the instructions, when executed by the at least one computing apparatus, cause the at least one computing apparatus to perform the following operations:

in response to an operation of expediting a target message, displaying an expediting interface which comprises a plurality of expediting modes;

in response to an operation of selecting a target expediting mode, determining whether an expediting object selected in the expediting interface meets interception conditions corresponding to the target expediting mode; and when the interception conditions are met, displaying the intercepted expediting object and interception reasons in the expediting interface, wherein the plurality of expediting modes comprise one or more of the following: in-app only, app+SMS, and app+phone call.

10. The system according to claim 9, wherein if the target expediting mode is app+SMS or app+phone call, the interception conditions corresponding to the target expediting mode comprise at least one of the following:

the expediting object crossing domains, the expediting object being an external non-friend, and the information of the expediting object being incomplete.

11. The system according to claim 9, wherein determining whether an expediting object selected in the expediting interface meets interception conditions corresponding to the target expediting mode comprises:

acquiring client information of the selected expediting object, wherein the client information comprises one or more of the following: client deployment information, client location information, and client registration information; and determining, based on the client information, whether the interception conditions corresponding to the target expediting mode are met.

12. The system according to claim 11, wherein determining, based on the client information, whether the interception conditions corresponding to the target expediting mode are met comprises:

determining, based on the client deployment information, whether deployment domains are crossed; and if so, determining that the interception conditions corresponding to the SMS or phone call expediting mode are met;

determining, based on the client location information, whether domains are crossed; and if so, determining that the interception conditions corresponding to the SMS or phone call expediting mode are met;

determining, based on the client registration information, whether the selected expediting object is an external non-friend; and if so, determining that the interception conditions corresponding to the SMS or phone call expediting mode are met; and determining, based on the client registration information, whether the registration information is missing a phone number; and if so, determining that the interception conditions corresponding to the SMS or phone call expediting mode are met.

13. The system according to claim 9, wherein displaying the intercepted expediting object and interception reasons in the expediting interface comprises one or more of the following:

displaying an early warning prompt in a display area of the plurality of expediting modes; and in response to an operation of a mouse pointer hovering over the early warning prompt, displaying at least one interception reason;

within the selected area in the expediting interface, displaying at least one interception reason at the top and displaying the intercepted expediting objects first; and displaying the intercepted expediting object in the expediting interface, displaying the early warning prompt on an icon of the intercepted expediting object, and in response to the operation of the mouse pointer hovering over the early warning prompt, displaying the interception reasons of the intercepted expediting object.

14. A non-transitory computer-readable storage medium storing programs or instructions which, when executed by at least one computing apparatus, cause the at least one computing apparatus to perform the following operations:

in response to an operation of expediting a target message, displaying an expediting interface which comprises a plurality of expediting modes;

in response to an operation of selecting a target expediting mode, determining whether an expediting object selected in the expediting interface meets interception conditions corresponding to the target expediting mode; and when the interception conditions are met, displaying the intercepted expediting object and interception reasons in the expediting interface, wherein the plurality of expediting modes comprise one or more of the following: in-app only, app+SMS, and app+phone call.

15. The non-transitory computer-readable storage medium according to claim 14, wherein if the target expediting mode is app+SMS or app+phone call, the interception conditions corresponding to the target expediting mode comprise at least one of the following:

the expediting object crossing domains, the expediting object being an external non-friend, and the information of the expediting object being incomplete.

16. The non-transitory computer-readable storage medium according to claim 14, wherein determining whether an expediting object selected in the expediting interface meets interception conditions corresponding to the target expediting mode comprises:

acquiring client information of the selected expediting object, wherein the client information comprises one or more of the following: client deployment information, client location information, and client registration information; and determining, based on the client information, whether the interception conditions corresponding to the target expediting mode are met.

17. The non-transitory computer-readable storage medium according to claim 16, wherein determining, based on the client information, whether the interception conditions corresponding to the target expediting mode are met comprises:

determining, based on the client deployment information, whether deployment domains are crossed; and if so, determining that the interception conditions corresponding to the SMS or phone call expediting mode are met;

determining, based on the client location information, whether domains are crossed; and if so, determining that the interception conditions corresponding to the SMS or phone call expediting mode are met;

determining, based on the client registration information, whether the selected expediting object is an external non-friend; and if so, determining that the interception conditions corresponding to the SMS or phone call expediting mode are met; and determining, based on the client registration information, whether the registration information is missing a phone number; and if so, determining that the interception conditions corresponding to the SMS or phone call expediting mode are met.

* * * * *